(12) United States Patent
Lee et al.

(10) Patent No.: US 7,956,111 B2
(45) Date of Patent: *Jun. 7, 2011

(54) NON-HALOGEN FLAMEPROOF POLYCARBONATE RESIN COMPOSITION

(75) Inventors: Min Soo Lee, Uiwang-si (KR); Beom Jun Joo, Uiwang-si (KR)

(73) Assignee: Cheil Industries, Inc., Gumi-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/632,862

(22) Filed: Dec. 8, 2009

(65) Prior Publication Data

US 2010/0152345 A1    Jun. 17, 2010

(30) Foreign Application Priority Data

Dec. 12, 2008  (KR) .................. 10-2008-0126417

(51) Int. Cl.
*C08K 5/523*    (2006.01)
(52) U.S. Cl. ........................ 524/141; 524/140
(58) Field of Classification Search .......... 524/140, 524/141
See application file for complete search history.

(56) References Cited

U.S. PATENT DOCUMENTS

| | | | |
|---|---|---|---|
| 3,639,506 A | 2/1972 | Haaf | |
| 4,492,660 A | 1/1985 | Giolito | |
| 4,542,170 A * | 9/1985 | Hall et al. | 523/179 |
| 6,140,399 A | 10/2000 | Munro | |
| 2010/0004364 A1 * | 1/2010 | Lee et al. | 524/151 |

FOREIGN PATENT DOCUMENTS

| | | |
|---|---|---|
| EP | 0728811 A2 | 8/1996 |
| EP | 0970997 A2 | 1/2000 |

OTHER PUBLICATIONS

European Search Report in commonly owned European Application No. 09164538.2, dated Oct. 5, 2009, pp. 1-7.
Anonymous, "Phosphoric acid 2, 4-bis (1, 1-dimethylethyl)phenyl diphenyl ester", Database Registry, Jun. 18, 2008, p. 1.
Office Action in commonly owned U.S. Appl. No. 12/496,717 dated Nov. 1, 2010, pp. 1-6.
European Patent Office Intention to Grant in commonly owned European Application No. 09164538.2, dated Nov. 2, 2010, pp. 1-4.

* cited by examiner

*Primary Examiner* — Peter Szekely
(74) *Attorney, Agent, or Firm* — Summa, Additon & Ashe, P.A.

(57) ABSTRACT

A non-halogen flameproof polycarbonate resin composition of the present invention comprises about 100 parts by weight of a polycarbonate resin; and about 0.5 to about 10 parts by weight a phosphorus compound represented by the following Chemical Formula (1) or a combination thereof. The present invention can provide an environmentally friendly polycarbonate resin composition which can have excellent retardancy without releasing hydrogen halide gases during preparation or combustion.

[Chemical Formula 1]

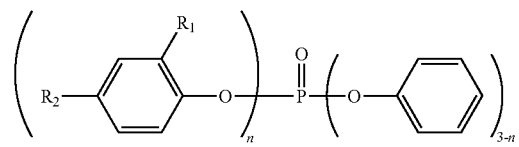

wherein $R_1$ and $R_2$ are each independently $C_1$ to $C_6$ alkyl and n is 1 or 2.

22 Claims, No Drawings

NON-HALOGEN FLAMEPROOF POLYCARBONATE RESIN COMPOSITION

CROSS-REFERENCE TO RELATED APPLICATION

This application claim priority from Korean Patent Application No. 2008-0126417, filed on Dec. 12, 2008 in the Korean Intellectual Property Office, the disclosure of which is incorporated herein by reference in its entirety.

FIELD OF THE INVENTION

The present invention relates to a non-halogen flameproof polycarbonate resin composition.

BACKGROUND OF THE INVENTION

Generally, polycarbonate resins have transparency, high impact strength, heat resistance and electrical properties. Therefore, polycarbonate resins have been widely used in the production of large injection molded products, such as electric or electronic goods and office equipment which emit a lot of heat. Accordingly, flame retardancy, heat resistance and high mechanical strength are important factors that should be considered when manufacturing a polycarbonate composition.

Conventionally to provide a polycarbonate resin with good flame retardancy, a halogen-containing flame retardant or an antimony-containing compound were used. However, halogen-containing compounds can corrode a mold due to hydrogen halide gases released during the molding process. In addition, there are safety concerns associated with the use of halogen-containing compounds because toxic gases can be liberated in the case of fire.

One method to impart flame retardancy to a polycarbonate resin without using a halogen-containing compound is to employ a phosphoric acid ester compound as a flame retardant. However, a juicing phenomenon can occur when using a phosphoric acid ester compound due to the migration of the flame retardant agent to the surface of the molded article during the molding process. Further, the heat resistance can be rapidly deteriorated.

EP 0 728 811 discloses a thermoplastic resin composition comprising an aromatic polycarbonate, a graft copolymer, a vinyl copolymer and a phosphazene. EP '811 states that no dripping occurs during combustion when using a phosphazene as a flame retardant even though an additional anti-dripping agent is not employed, and that the resin composition has excellent heat resistance and impact strength. However, in EP '811, when using phosphazene as a flame retardant, an increased amount of flame retardants should be used to maintain a certain degree of flame retardancy.

SUMMARY OF THE INVENTION

The present invention provides an environmentally friendly flameproof polycarbonate resin composition which can have good flame retardancy and heat resistance without releasing hydrogen halide gases during combustion by employing a phosphorus compound having a new structure as a flame retardant with a polycarbonate resin.

The present invention provides an excellent flameproof polycarbonate resin composition.

The present invention provides a flameproof polycarbonate resin composition which employs a phosphorus compound having a new structure as a flame retardant.

The present invention further provides an environmentally friendly polycarbonate resin composition by employing a phosphorus compound having a new structure as a flame retardant which does not release hydrogen halide gases during preparation of the composition or an article therefrom or during combustion.

The present invention further provides a molded article produced from a non-halogen flameproof polycarbonate resin composition.

A non-halogen flameproof polycarbonate resin composition of the present invention comprises about 100 parts by weight of a polycarbonate resin; and about 0.5 to about 10 parts by weight of a phosphorus compound represented by the following Chemical Formula (1) or a combination thereof.

[Chemical Formula 1]

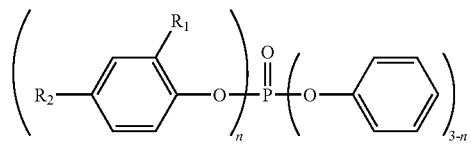

wherein $R_1$ and $R_2$ are each independently $C_1$ to $C_6$ alkyl and n is 1 or 2.

In exemplary embodiments of the invention, examples of the phosphorus compound may include without limitation 2,4-di-tert-butylphenyl diphenyl phosphate represented by the following Chemical Formula (2-1), bis(2,4-di-tert-butylphenyl)phenyl phosphate represented by the following Chemical Formula (2-2), and combinations thereof.

[Chemical Formula 2-1]

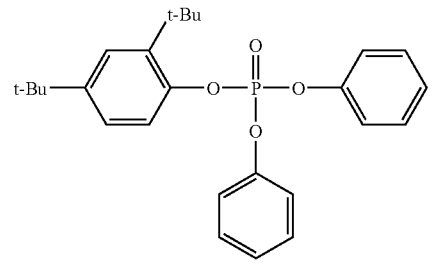

[Chemical Formula 2-2]

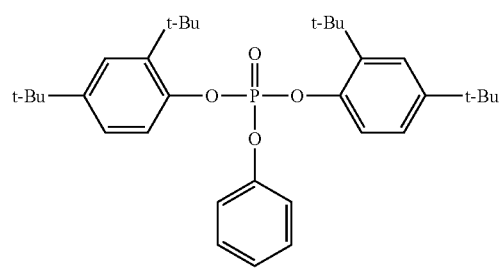

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin The polycarbonate resin used in the resin composition of the present invention may be prepared through a conventional method as known in the art. The polycarbonate resin is not limited and can be any commercially available polycarbonate.

The polycarbonate resin may be prepared by reacting a diphenol compound represented by the following Chemical Formula (1) with a phosgene, a halogen formate or a carboxylic acid diester:

[Chemical Formula I]

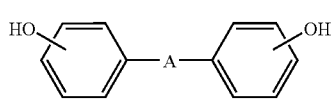

wherein A is a single bond, $C_1$ to $C_5$ alkylene group, $C_1$ to $C_5$ alkylidene group, $C_5$ to $C_6$ cycloalkylidene group, —S— or —$SO_2$—.

Examples of the diphenols of Chemical Formula (1) may include without limitation 4,4'-dihydroxydiphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and the like, and combinations thereof. Hydroquinone, resorcinol, and combinations thereof can be used. In exemplary embodiments, the diphenol used in the present invention can be 2,2-bis-(4-hydroxyphenyl)-propane (also called 'bisphenol-A').

In the present invention, the polycarbonate resin can have a weight average molecular weight ($M_w$) of about 10,000 to about 500,000 g/mol, for example about 15,000 to about 100,000 g/mol. If the weight average molecular weight of the polycarbonate resin is less than about 10,000 g/mol, physical properties and thermal resistance may be deteriorated. If the weight average molecular weight of the polycarbonate resin is more than about 500,000 g/mol, moldability may be deteriorated.

Examples of the polycarbonate resin can include without limitation linear polycarbonate resin, branched polycarbonate resin, polyester-carbonate resin, and the like, and combinations thereof. The polycarbonate resin may be prepared by using about 0.05 to about 2 mol %, based on total quantity of diphenols used, of tri- or higher functional compounds, for example, those with three or more phenolic groups. The polyester-carbonate resin may be obtained by polymerization in the presence of an ester precursor, such as a difunctional carboxylic acid. Further, a homopolymer of polycarbonate, a copolymer of polycarbonate or a combination thereof may be used in this invention.

(B) Phosphorus Compound

The phosphorous compound of the present invention is represented by the following Chemical Formula (1):

[Chemical Formula 1]

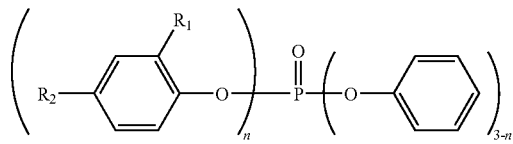

wherein $R_1$ and $R_2$ are each independently $C_1$ to $C_6$ alkyl and n is 1 or 2. The alkyl may have a linear or branched structure.

In one exemplary embodiment, $R_1$ and $R_2$ are each independently $C_3$ to $C_6$ branched alkyl. For example, $R_1$ and $R_2$ may be each independently isopropyl, sec-butyl, tert-butyl, or isoamyl.

Examples of the phosphorus compounds can include without limitation 2,4-di-tert-butylphenyl diphenyl phosphate represented by the following Chemical Formula (2-1), bis(2,4-di-tert-butylphenyl)phenyl phosphate represented by the following Chemical Formula (2-2), and combinations thereof.

[Chemical Formula 2-1]

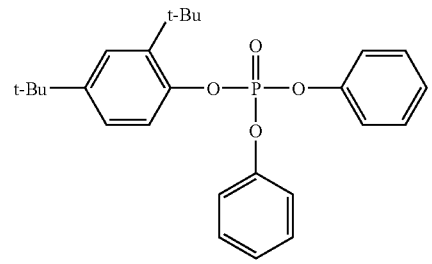

[Chemical Formula 2-2]

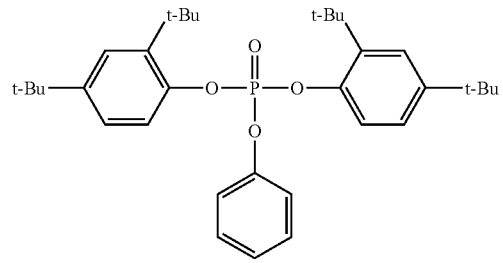

The phosphorus compound represented by Chemical Formula (1) or a combination thereof is used in an amount of about 0.5 to about 10 parts by weight, for example about 1 to about 8 parts by weight, and as another example about 3 to about 5 parts by weight, per about 100 parts by weight of a polycarbonate resin.

If the amount of the phosphorus compound represented by Chemical Formula (1) is more than about 10 parts by weight, the balance of physical properties of the resin may be deteriorated. If the amount of the phosphorus compound represented by Chemical Formula (1) is less than about 0.5 parts by weight, flame retardancy may be deteriorated.

As indicated by the following Reaction Formula I, phosphorus oxychloride can react with 2,4-dialkylphenol represented by Chemical Formula (3) to prepare a phosphate compound represented by Chemical Formula (4), and the resulting phosphate compound represented by Chemical Formula (4) can react with phenol to obtain the phosphorus compound represented by Chemical Formula (1) of the present invention.

[Reaction formula 1]

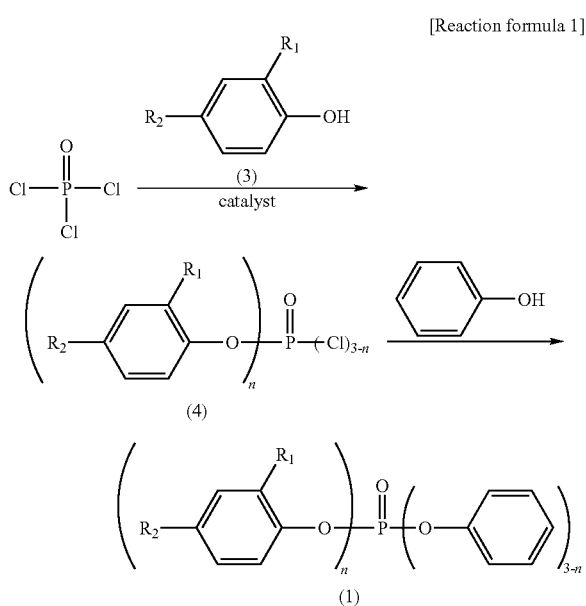

wherein $R_1$ and $R_2$ are each independently $C_1$ to $C_6$ alkyl and n is 1 or 2.

In exemplary embodiments of the invention, the phosphate compound represented by Chemical Formula (4) can be prepared by dehydrochlorination of phosphorus oxychloride and 2,4-dialkylphenol.

Examples of the 2,4-dialkylphenol compound may include 2,4-di-tert-butylphenol represented by the following Chemical Formula (5).

[Chemical Formula 5]

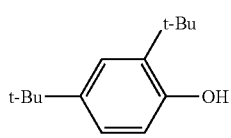

An excess mole ratio of the phosphorus oxychloride can be used, per one mole of 2,4-dialkylphenol, for example 3 to 6 mole ratio phosphorus oxychloride per one mole of 2,4-dialkylphenol, as another example 4 to 6 mole ratio phosphorus oxychloride per one mole of 2,4-dialkylphenol, and as yet another example 5 mole ratio phosphorus oxychloride per one mole of 2,4-dialkylphenol.

One mole of the phosphorus oxychloride can react with a maximum 3 moles of the 2,4-dialkylphenol compound because one molecule of phosphorus oxychloride contains 3 atoms of chlorine which can participate in dehydrochlorination.

However, if an excess of the phosphorus oxychloride is used, per one mole of the 2,4-dialkylphenol compound, phosphorous oxychloride and 2,4-dialkylphenol compound can react in a mole ratio of 1 to 1 to obtain 2,4-dialkylphenyl dichlorophosphate represented by the following Chemical Formula (4-1).

[Chemical Formula 4-1]

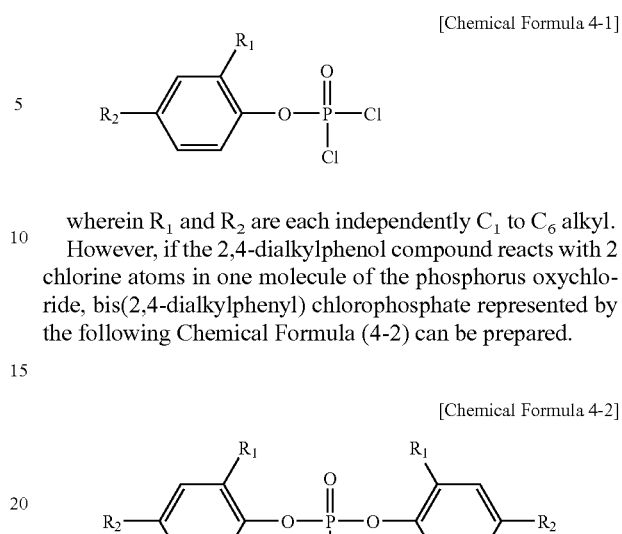

wherein $R_1$ and $R_2$ are each independently $C_1$ to $C_6$ alkyl.

However, if the 2,4-dialkylphenol compound reacts with 2 chlorine atoms in one molecule of the phosphorus oxychloride, bis(2,4-dialkylphenyl) chlorophosphate represented by the following Chemical Formula (4-2) can be prepared.

[Chemical Formula 4-2]

wherein $R_1$ and $R_2$ are each independently $C_1$ to $C_6$ alkyl.

In exemplary embodiments of the present invention, the phosphorous oxychloride can react with the 2,4-dialkylphenol compound in the presence of a metal catalyst.

Examples of the metal catalyst can include without limitation magnesium chloride, aluminum chloride calcium chloride, and the like, and combinations thereof.

The metal catalyst can be used in an amount of about 0.01 to about 10 mole ratio, per one mole of the 2,4-dialkylphenol compound, for example, about 0.001 to about 5 mole ratio per one mole of the 2,4-dialkylphenol compound, and as another example about 0.01 to about 1 mole ratio per one mole of the 2,4-dialkylphenol compound.

The phosphate compound represented by the Chemical Formula (4) can be prepared by reacting a phosphorus oxychloride with the 2,4-dialkylphenol compound at a temperature of about 100° C. to about 150° C. for about 3 hours to about 10 hours, optionally using a metal catalyst under a nitrogen atmosphere.

After the above reaction, remaining unreacted phosphorus oxychloride can be collected or recovered.

If the 2,4-dialkylphenol compound, phosphorous oxychloride and metal catalyst react in a mole ratio of 1:3 to 6:0.001 to 10, the phosphate compound represented by the Chemical Formula (4) and remaining unreacted phosphorus oxychloride can be prepared. The temperature of the product can be reduced at about 50° C. to about 90° C., for example about 90° C. Then, the pressure of the product is released to collect the remains of the unreacted phosphorus oxychloride.

Continually, the phosphorus compound represented by the Chemical Formula (1) can be prepared by reacting the phosphate compound represented by the Chemical Formula (4) with phenol.

In exemplary embodiments, the phosphorus compound represented by Chemical Formula (1) can be prepared by reacting the product from which unreacted phosphorus oxychloride has been removed with phenol. The phenol can be added in a mole ratio of about 2 to about 3, for example about 2, per one mole of the 2,4-dialkylphenol compound represented by the Chemical Formula (3).

The phosphorus oxychloride may be reacted with the 2,4-dialkylphenol compound in the presence of an organic solvent. Examples of the organic solvent can include without limitation benzene, toluene, xylene, 1,4-dioxane, methylene chloride, ethylene chloride, and the like. The organic solvents may be used singly or in combination.

The phosphorus compound represented by the Chemical Formula (1) can be prepared by reacting the phosphate compound represented by the Chemical Formula (4) with phenol at a temperature of about 100° C. to about 150° C. for about 3 to about 7 hours under a nitrogen atmosphere.

Finally, in order to separate the phosphorus compound represented by the Chemical Formula (1) which is manufactured, water can be added to the reactor when the reaction is completed and the mixture can be stirred and evaporated under reduced pressure to remove the organic layer.

The flameproof polycarbonate resin composition of the present invention may further include other additive depending on its use. Examples of such additives may include without limitation plasticizers, heat stabilizers, anti-dripping agents, antioxidants, compatibilizers, light-stabilizer, pigments, dyes, and/or inorganic fillers and the like, and combinations thereof. Examples of the inorganic fillers may include without limitation asbestos, glass fibers, talc, ceramic, sulfates, and the like, and combinations thereof. The additive can be employed in an amount of about 30 parts by weight or less, for example about 0.001 to about 30 parts by weight, per about 100 parts by weight of the polycarbonate resin.

The flameproof polycarbonate resin composition of the present invention can be prepared by a conventional method. For example, all the components and optionally additives can be mixed together and extruded through an extruder and can be prepared in the form of pellets.

The flameproof polycarbonate resin composition according to the present invention can have good flame retardancy and can be used in the manufacture of electric or electronic goods such as TV housings, computers, audio sets, air conditioners, automobile parts, housings for office automation devices, and the like which require good flame retardancy.

Another aspect of the present invention provides an article molded from the foregoing resin composition. The resin pellets can be molded into various molded articles using molding methods such as extrusion, injection, vacuum molding, casting molding and the like, but the present invention is not limited to these methods.

The invention may be better understood by reference to the following examples which are intended for the purpose of illustration and are not to be construed as in any way limiting the scope of the present invention, which is defined in the claims appended hereto.

EXAMPLES

The components to prepare the flameproof polycarbonate resin compositions in Examples 1 to 2 and Comparative Examples 1 to 2 are as follows:

(A) Polycarbonate Resin

Bisphenol-A type polycarbonate with a weight average molecular weight ($M_w$) of about 25,000 manufactured by TEIJIN Co. of Japan (PANLITE L-1250WP) is used as a linear polycarbonate resin.

(B) Phosphorus Compound

Phosphorus oxychloride (767 g, 5.0 mol), 2,4-di-tert-butylphenol (206 g, 1 mol) and magnesium chloride (0.95 g, 0.01 mol) are added into a reactor and stirred at 130° C. for 6 hours under a nitrogen atmosphere to obtain 2,4-di-tert-butylphenyl dichlorophosphate and bis(2,4-di-tert-butylphenyl) chlorophosphate. The 2,4-di-tert-butylphenyl dichlorophosphate is prepared in an amount of 0.98 mol and bis(2,4-di-tert-butylphenyl) chlorophosphate is prepared in an amount of 0.02 mol.

The temperature of the product is reduced at 90° C. and the pressure of the product is released to collect remaining unreacted phosphorus oxychloride. Then, phenol (188 g, 2 mol) and toluene (1 L) are added into the reactor and stirred at 130° C. for about 5 hours under a nitrogen atmosphere. After the completion of the reaction, the temperature of the mixture is reduced to room-temperature, water is added (1 L) and the mixture is stirred. After the organic layer is removed, the mixture is evaporated under reduced pressure to obtain a mixture of 2,4-di-tert-butylphenyl diphenyl phosphate (0.98 mol) represented by Chemical Formula (2-1) above and bis (2,4-di-tert-butylphenyl)phenyl phosphate (0.02 mol) represented by Chemical Formula (2-2) above.

(C) Aromatic Phosphoric Ester Compound

Bis(dimethylphenyl) phosphate bisphanol-A made by Daihachi Chemical of Japen (product name: CR741S) is used.

Examples 1 to 2 and Comparative Examples 1 to 2

The components as shown in the following table 1 are added to a conventional mixer and the mixture is extruded through a conventional twin screw extruder at a temperature range of about 200° C. to about 280° C. to prepare pellets. The prepared pellets are dried at 80° C. for 2 hours and molded into test specimens for flame retardancy in a 6 oz injection molding machine at about 180 to about 280° C. with a mold temperature of about 40 to about 80° C. Flame retardancy is measured in accordance with UL 94 VB under a thickness of 1/8".

TABLE 1

|  | Examples | | Comparative Examples | |
| --- | --- | --- | --- | --- |
|  | 1 | 2 | 3 | 4 |
| A | 100 | 100 | 100 | 100 |
| B | 3 | 5 | — | — |
| C | — | — | 3 | 5 |
| The first Average Flame Out Time(sec) | 1.0 | 0.6 | 11.5 | 6.1 |
| The second Average Flame Out Time(sec) | 5.8 | 3.1 | 1.0 | 3.5 |
| UL 94 flame retardancy (1/8") | V-0 | V-0 | V-1 | V-0 |

As shown in Table 1, the resin compositions employing a new phosphorous compound show good flame retardancy and a short average flame out time.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A non-halogen flameproof polycarbonate resin composition comprising:
about 100 parts by weight of a polycarbonate resin; and
about 0.5 to about 10 parts by weight of a phosphorus compound represented by the following Chemical Formula (1) or a combination thereof:

[Chemical Formula 1]

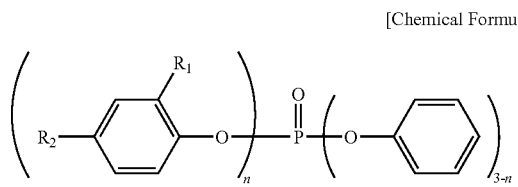

wherein $R_1$ and $R_2$ are each independently $C_1$ to $C_6$ alkyl and n is 1 or 2.

2. The non-halogen flameproof polycarbonate resin composition of claim 1, wherein said $R_1$ and $R_2$ are each independently $C_3$ to $C_6$ branched alkyl.

3. The non-halogen flameproof polycarbonate resin composition of claim 1, wherein said phosphorus compound comprises 2,4-di-tert-butylphenyl diphenyl phosphate represented by the following Chemical Formula (2-1), bis(2,4-di-tert-butylphenyl)phenyl phosphate represented by the following Chemical Formula (2-2), or a combination thereof:

[Chemical Formula 2-1]

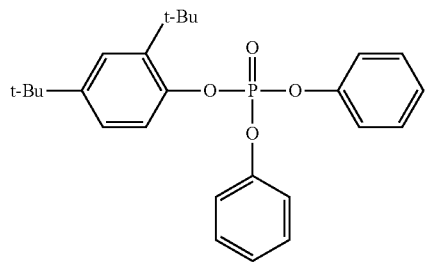

[Chemical Formula 2-2]

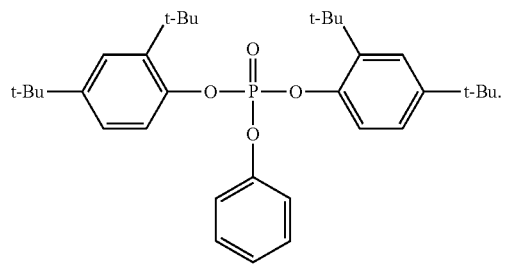

4. The non-halogen flameproof polycarbonate resin composition of claim 1, wherein said polycarbonate resin has a weight average molecular weight of about 10,000 to about 500,000 g/mol.

5. The non-halogen flameproof polycarbonate resin composition of claim 1, further comprising about 30 parts by weight or less of an additive selected from the group consisting of plasticizers, heat stabilizers, anti-dripping agents, antioxidants, compatibilizers, light-stabilizer, pigments, dyes, inorganic filler and combinations thereof.

6. A molded article produced from the non-halogen flameproof polycarbonate resin composition as defined by claim 1.

7. The non-halogen flameproof polycarbonate resin composition of claim 2, wherein said $R_1$ and $R_2$ are each independently isopropyl, sec-butyl, tert-butyl, or isoamyl.

8. The non-halogen flameproof polycarbonate resin composition of claim 7, wherein said $R_1$ and $R_2$ are each tert-butyl.

9. The non-halogen flameproof polycarbonate resin composition of claim 3, wherein said phosphorus compound comprises 2,4-di-tert-butylphenyl diphenyl phosphate represented by Chemical Formula (2-1).

10. The non-halogen flameproof polycarbonate resin composition of claim 3, wherein said phosphorus compound comprises bis(2,4-di-tert-butylphenyl)phenyl phosphate represented by Chemical Formula (2-2).

11. The non-halogen flameproof polycarbonate resin composition of claim 3, wherein said phosphorus compound comprises a combination of 2,4-di-tert-butylphenyl diphenyl phosphate represented by Chemical Formula (2-1) and bis(2,4-di-tert-butylphenyl)phenyl phosphate represented by Chemical Formula (2-2).

12. The non-halogen flameproof polycarbonate resin composition of claim 1, comprising said phosphorus compound in an amount of about 1 to about 8 parts by weight.

13. The non-halogen flameproof polycarbonate resin composition of claim 12, comprising said phosphorus compound in an amount of about 3 to about 5 parts by weight.

14. The molded article of claim 6, wherein said $R_1$ and $R_2$ are each independently $C_3$ to $C_6$ branched alkyl.

15. The molded article of claim 6, wherein said phosphorus compound comprises 2,4-di-tert-butylphenyl diphenyl phosphate represented by the following Chemical Formula (2-1), bis(2,4-di-tert-butylphenyl)phenyl phosphate represented by the following Chemical Formula (2-2), or a combination thereof:

[Chemical Formula 2-1]

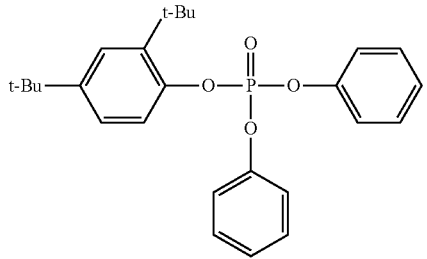

[Chemical Formula 2-2]

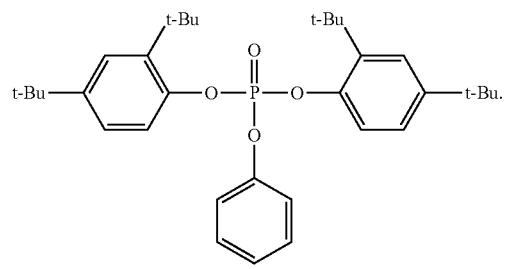

16. The molded article of claim 6, wherein said $R_1$ and $R_2$ are each independently isopropyl, sec-butyl, tert-butyl, or isoamyl.

17. The molded article of claim 16, wherein said $R_1$ and $R_2$ are each tert-butyl.

18. The molded article of claim 6, wherein said phosphorus compound comprises 2,4-di-tert-butylphenyl diphenyl phosphate represented by Chemical Formula (2-1).

19. The molded article of claim 6, wherein said phosphorus compound comprises bis(2,4-di-tert-butylphenyl)phenyl phosphate represented by Chemical Formula (2-2).

20. The molded article of claim 6, wherein said phosphorus compound comprises a combination of 2,4-di-tert-butylphenyl diphenyl phosphate represented by Chemical Formula (2-1) and bis(2,4-di-tert-butylphenyl)phenyl phosphate represented by Chemical Formula (2-2).

21. The molded article of claim 6, comprising said phosphorus compound in an amount of about 1 to about 8 parts by weight.

22. The molded article of claim 21, comprising said phosphorus compound in an amount of about 3 to about 5 parts by weight.

* * * * *